May 15, 1962 F. M. MAYES ETAL 3,034,217
TANK GAUGE
Filed Sept. 21, 1956 8 Sheets-Sheet 1

FIG. I.

INVENTORS
FRED M. MAYES &
JACK W. JONES
BY
ATTORNEYS

May 15, 1962 F. M. MAYES ETAL 3,034,217
TANK GAUGE
Filed Sept. 21, 1956 8 Sheets-Sheet 2

*INVENTORS*
FRED M. MAYES &
JACK W. JONES
BY
*Busser, Smith & Harding*
ATTORNEYS

INVENTORS
FRED M. MAYES &
JACK W. JONES
BY
ATTORNEYS

May 15, 1962    F. M. MAYES ETAL    3,034,217
TANK GAUGE
Filed Sept. 21, 1956    8 Sheets-Sheet 4

*INVENTORS*
FRED M. MAYES &
JACK W. JONES
BY

*ATTORNEYS*

FIG. 11.

INVENTORS
FRED M. MAYES &
JACK W. JONES
BY
ATTORNEYS

FIG. 12.

INVENTORS
FRED M. MAYES &
JACK W. JONES
ATTORNEYS

May 15, 1962  F. M. MAYES ETAL  3,034,217
TANK GAUGE

Filed Sept. 21, 1956  8 Sheets-Sheet 8

INVENTORS
FRED M. MAYES &
BY  JACK W. JONES

ATTORNEYS

United States Patent Office 3,034,217
Patented May 15, 1962

3,034,217
TANK GAUGE
Fred M. Mayes and Jack Weir Jones, Richardson, Tex., assignors to Sun Oil Company, Philadelphia, Pa., a corporation of New Jersey
Filed Sept. 21, 1956, Ser. No. 611,291
12 Claims. (Cl. 33—126.6)

This invention relates to tank gauges, and, particularly, to means operating automatically to transmit tank gauge readings to a remote recording or reading location.

In the applications of Fred M. Mayes, Serial Numbers 493,367 and 506,056, filed, respectively, March 10, 1955, and May 4, 1955, now Patent No. 2,899,751 and 2,930,131 respectively there are disclosed tank gauges adapted particularly for the transmission of coded pulses to a location remote from the tank being gauged and serving to indicate the quantity of liquid in a tank. As disclosed in said applications, the tank gauges are highly sensitive and accurate and the arrangement is such that indications from a number of tanks may be transmitted to a single central location for reading or recording. In brief, these tank gauges involve the imparting of vertical movements to weights or floats with sharp indication of some critical relationship attained by the weight or float with respect to a liquid surface during such vertical movements. The vertical movements also provide coded electrical outputs in such fashion that the position of the weight or float may be very accurately determined through any portion of a very large range of movement of the liquid level.

It is the general object of the present invention to provide a tank gauge of the general type disclosed in said prior applications but involving various features leading to simplicity, high reliability and ease of reading or recording.

One of the objects of the present invention is to provide a cycle-controlling and decoding system which, specifically, transforms binary signals transmitted from the gauge into decimal signals adapted for the direct operation of a decimal light panel or printing mechanism.

The foregoing and other objects of the invention particularly relating to details of construction and operation will become apparent from the following description read in conjunction with the accompanying drawings, in which.

Figure 1:
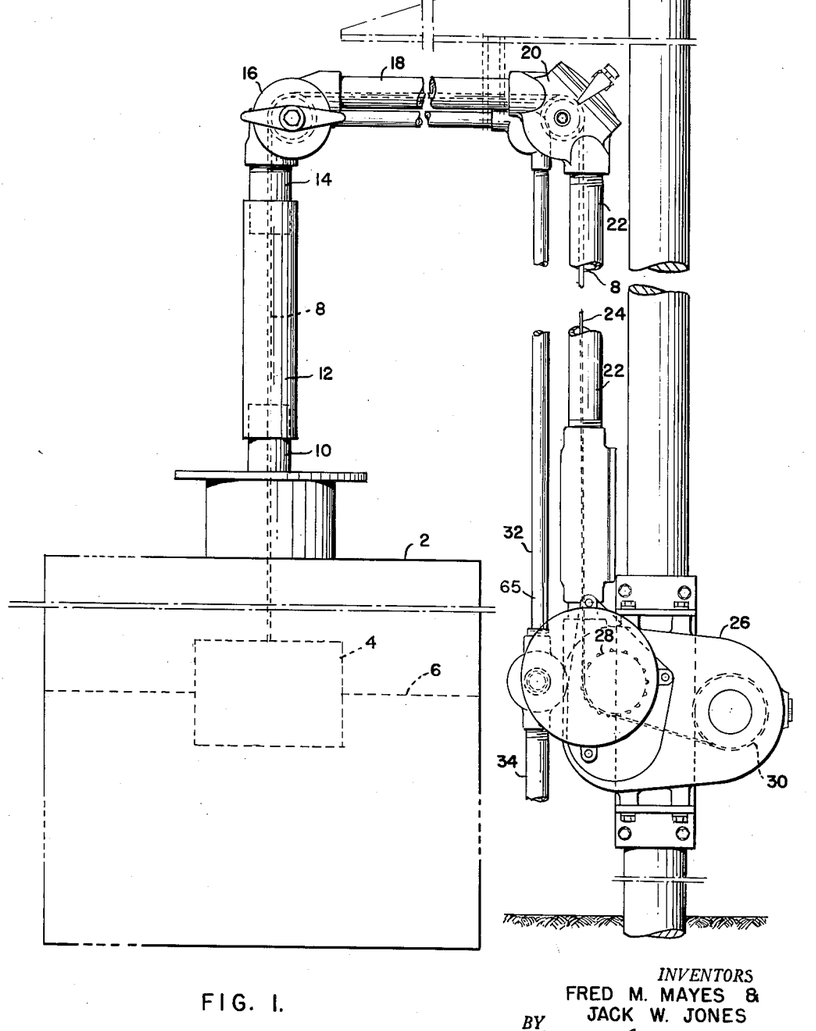
FIGURE 1 is a fragmentary view showing the transmitting apparatus associated with a tank which is to be gauged.

Referring first to FIGURE 1 there is indicated at 2 a tank which is to be gauged, there being provided in the tank a float 4 cooperating with the surface of liquid 6 the quantity of which is to be measured. The float 4 is controlled through a cable 8 which passes upwardly through a pipe fitting 10 at the tank top, thence through a flexible hose 12 and pipe connections 14, about supporting means within a fitting 16, thence generally horizontally through a pipe 18 and about a pulley located within a fitting 20 and thence downwardly within a pipe 22. Within the pipe 22 the cable 8 is continued in the form of a perforated metallic tape 24 which, within a housing 26, passes about a toothed sprocket 28, the teeth of which engage the openings in the tape 24. It then passes to a takeup reel of a spring motor 30 which is desirably of the well known type arranged to provide an approximately constant tension on the tape providing a counterbalance which will ordinarily maintain the float in an approximately constant rest position with respect to the liquid surface. It may be here pointed out that in the present instance the rest position of the float in the liquid is not critical since the critical relative position determinative of the location of the liquid level is the relationship at which the float leaves the liquid surface as it is raised. The spring motor 30 is provided only to maintain the tape 24 and cable 8 in tensioned condition so that the position of the sprocket 28 always bears an accurate relationship to the vertical position of the float, this being true throughout a large range of float movement, which may well range over 50 feet. In the prior applications referred to above a tape corresponding to 24 is provided with coded perforations. In the present instance this is not the case, corresponding coding being provided on a photographic film so that the tape 24 is provided only with uniformly distributed openings for cooperation with the teeth of the sprocket 28. The provision of a coded photographic film leads to simplicity and high reliability, avoiding the possibility that perforations in a tape directly associated with the vapor in a tank may become clogged. An additional advantage is that a photographic film may be non-linearly coded to provide for direct readings of volume rather than level, taking into account the so-called "strapping" corrections.

Associated with the apparatus so far described are pipes 32 and 34 serving as electrical conduits. Desirably the apparatus through which the cable and tape pass is mounted independently of the tank walls on a standard anchored in the ground, the flexible hose 12 permitting relative movements which may occur between the tank and the apparatus due to temperature changes.

Figures 2, 3, 6, 8:
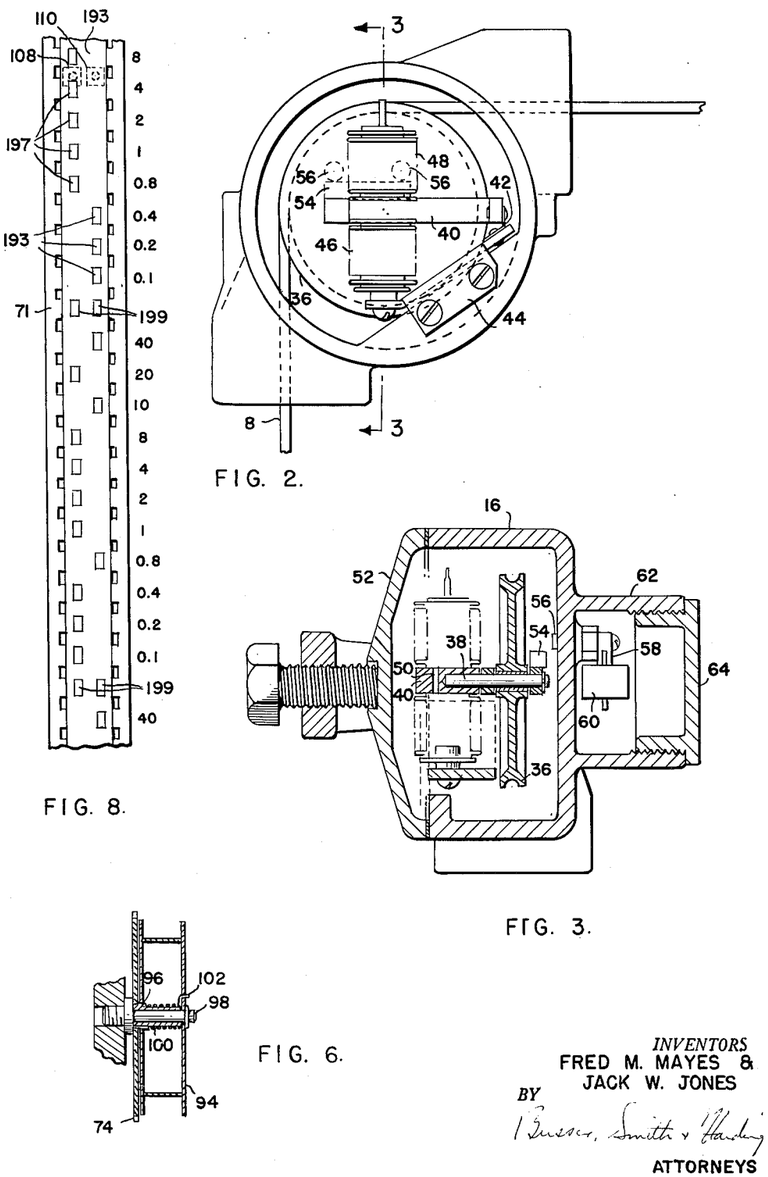
FIGURE 2 is a fragmentary view showing, with cover removed, a cable-supporting means providing an output signal sensitive to the relationship between a float and the surface of liquid in a tank.
FIGURE 3 is a vertical section taken on the plane indicated at 3—3 in FIGURE 2.
FIGURE 6 is a fragmentary sectional view showing particularly the film takeup means.
FIGURE 8 is a fragmentary view showing the nature of the coding provided on the film.

Referring now to FIGURES 2 and 3, there are shown therein the elements enclosed within the housing designated 16. A sheave 36 is journalled on a pin 38 secured in a lever 40 which is provided at its right hand end as viewed in FIGURE 2 with, effectively, a pivotal mounting by a spring 42 secured to a fixed support 44. Associated with the lever are Sylphon bellows 46 and 48 each of which is connected at one end to the lever, with the lower connected at its other end to a fixed anchorage. These bellows are filled with oil and sealed and have their interiors interconnected through a small bore 50 in the lever 40. Together with the spring 42 these bellows provide a spring mounting for the lever 40 to sustain it approximately in horizontal position against the downward pull exerted by the float during operation. They also supply a damping action by reason of their content of oil and their interconnection through the restricted opening 50. A cap 52 of the housing 16 serves to provide an enclosure for the elements just described.

The lever 40 through pin 38 mounts a strong bar magnet 54, for example, of alnico, this bar magnet being adjacent to but spaced from pole pieces 56 which form the ends of a magnetic core arrangement provided with a winding 60. As will be noted from FIGURE 3, the major part of the core structure and the winding is enclosed within a separate housing 62 cast as part of the fitting 16 and closed by a screw cap 64. The housing, in the form of a unitary casting, is desirably of aluminum so as not to interfere with the magnetic circuit which is involved. Depending upon the position of the magnet 54 with respect to the pole pieces 56 the core is more or less magnetically saturated with the result that the inductance presented by the coil 60 is directly dependent upon the position of the lever 40. The relationship may be approximately linear, though as will appear hereafter, this is not necessary.

Figure 4:
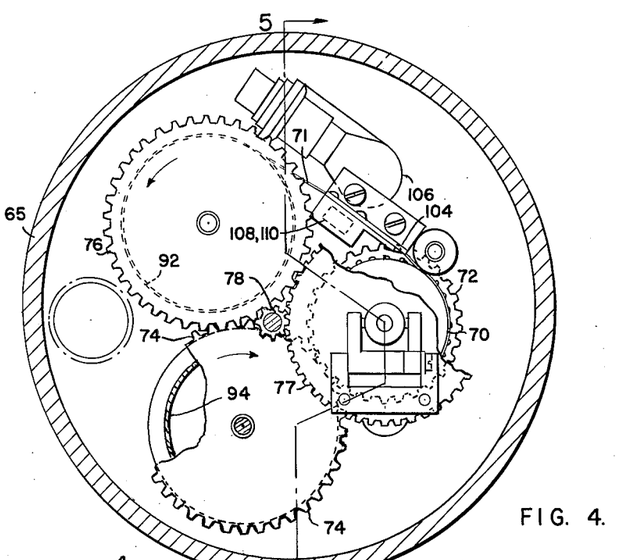
FIGURE 4 is a section taken on the plane indicated at 4—4 in FIGURE 5 and showing the parts particularly associated with a coded film and providing output pulses indicative of quantity of liquid in the tank.
Figure 5:
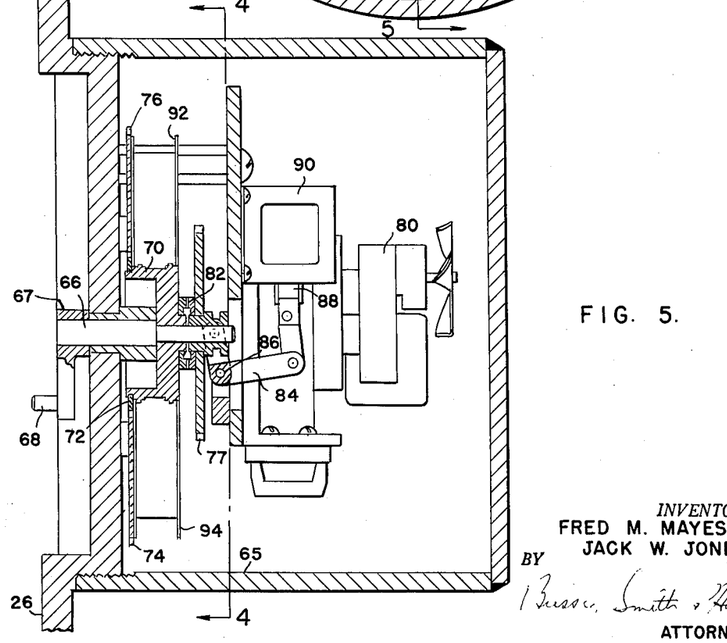
FIGURE 5 is an elevation partially in section taken on the line indicated at 5—5 through the devices illustrated in FIGURE 4, omitting the lamp shown in FIGURE 4.

The housing 26 has associated with it, though isolated therefrom against the passage of vapors, a housing 65, there passing through the wall between the housings a shaft 66 carrying a crank 67 provided with a pin 68 which enters an opening in the sprocket 28 so that the sprocket 28 is coupled through shaft 66 to a film sprocket 70 secured to the shaft and arranged for the drive of a sixteen millimeter photographic film 71 which is coded as hereafter described. The film sprocket 70 is provided with a gear 72 which meshes with a gear 74 mounted on a fixed pin, the gear 74 meshing with a gear 76 also mounted on a fixed pin. A gear 77 meshes with a small pinion 78 carried by the shaft of a reversible motor 80, the gear 77 being carried by one element of a clutch 82 which slides on the shaft 66 and is arranged to engage a second clutch element secured to the film sprocket 70. The clutch element connected to gear 77 is shifted through the bell crank 84 which is pivoted at 86 and operated by the plunger 88 of a solenoid 90.

The film 71 is reeled on reels 92 and 94 which are respectively driven by the gears 76 and 74. The reels are not directly connected to their respective gears, but in both cases the arrangement is as illustrated in FIGURE 6, the illustration referring specifically to the reel 94. In that particular case the gear 74 is secured to a sleeve 96 journalled on a supporting pin 98 and the reel 94 is mounted for free rotation relative to this sleeve except to the extent that it is restrained by a helical spring 100 which surrounds the sleeve and which is anchored at one end to the sleeve 96 and at its other end 102 is attached to the reel 94. As set up with the film in place, the springs 100 are both under tension so that as the feed takes place under the action of sprocket 70 the film tension is maintained irrespective of the increase and decrease of reel diameters produced in the reeling operation. As will be evident from the foregoing, the film 71 moves proportionally to the movement of the tape 24 so that to any position of the latter there corresponds a definite position of the former.

The film 71 passes from the reel 92 through a guide 104 between a lamp 106 and a pair of photocells, preferably phototransistors, 108, 110 to which more detailed reference will be made later.

Figure 9:
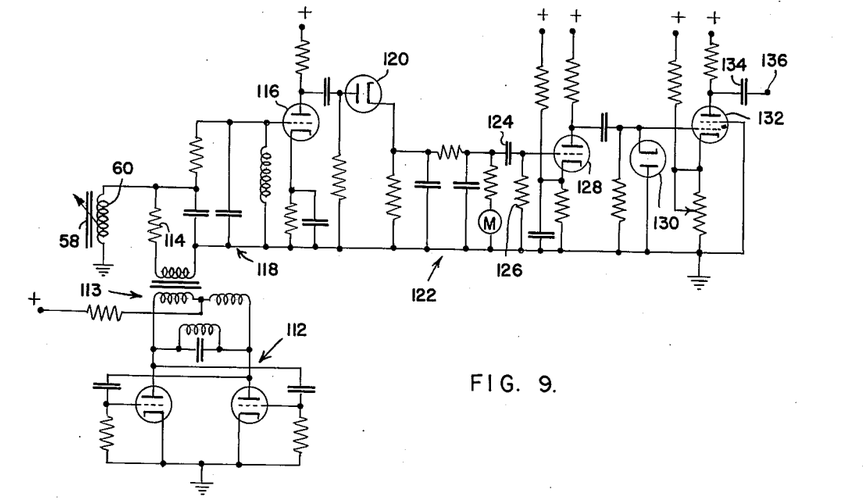
FIGURE 9 is a wiring diagram showing in particular the portion of an apparatus which gives rise to signals dependent upon the relationship of the float to the liquid in the tank.

FIGURE 9 shows the circuit used for the detection of emergence of the float from the liquid. An oscillator of conventional type indicated at 112 supplies alternating current at a suitable frequency (for example, 1,000 cycles per second, though the frequency is not at all critical) through a transformer 113 and resistor 114 to the winding 60 of the variable inductance arrangement already described. The junction of resistor 114 and winding 60 provides an input to the tuned circuit 118 which is tuned to the oscillator frequency. The signal across the tuned circuit is amplified by the triode 116 and its conventional connections and is then rectified by diode 120 followed by the filter 122 which eliminates the alternating component. The varying D.C. signal is then subjected to differentiation by the arrangement of capacitor 124 and resistor 126 and the differentiated signal is then amplified by triode 128 in a conventional amplifying circuit. The output signal from this amplifier is fed to the clamping diode 130 and to the control grid of a thyratron 132, the anode of which is connected through a large capacitor 134 to a terminal 136 which is connected to a relay coil as hereafter described, the relay being operated by the discharge of a capacitor 134 through the thyratron when the latter fires.

The type of operation will be referred to in greater detail later, but it may here be briefly stated that the change of voltage at the output of the filter 122 is approximately proportional to the displacement of the magnet which controls the effective inductance of the winding 60 by control of the degree of saturation of the core 58. As soon as the float emerges from the liquid the output voltage from the filter 122 levels off at a fixed value and the differentiator converts this event to a negative signal. The amplifier 128 inverts the phase of the signal and provides a positive output which fires the thyratron. During the period of rise of the float a negative signal appears at the amplifier output and is clamped by the diode 130 at ground potential.

Figure 10:
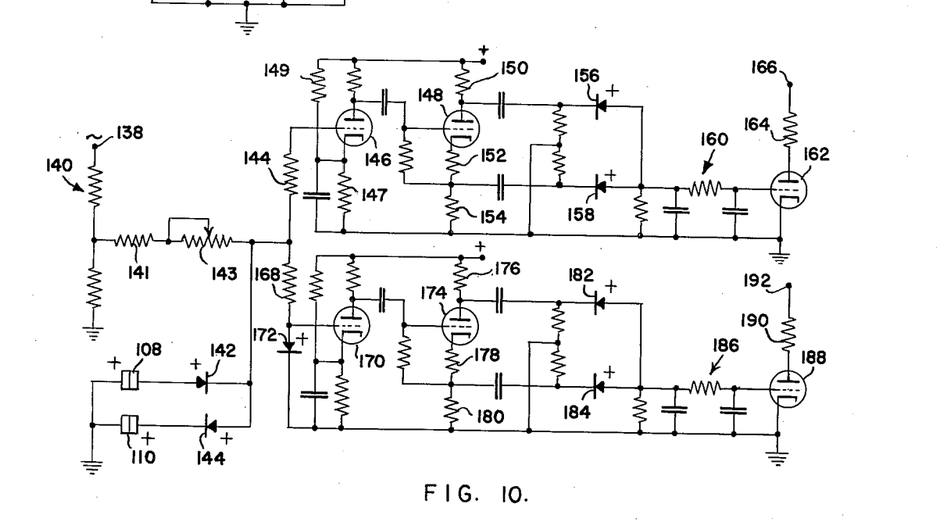
FIGURE 10 is a wiring diagram showing the photoelectric signal pickup means and its associated circuitry.

FIGURE 10 illustrates the code pulse reading circuit responsive to illumination of the photocells 108 and 110. An alternating 60 cycle potential with respect to ground is provided at terminal 138 and through voltage divider 140 and through the fixed and variable load resistors 141 and 143 applies a potential to a photocell and diode arrangement. The photocells 108 and 110 previously referred to are desirably phototransistors and in series with these are diodes 142 and 144 polarized to correspond to the polarization of the photocells, the diodes blocking reverse currents through the photocells. The feed to the photocell diode combinations is in parallel as illustrated so that, if illumination is present, the photocell 110 is conductive during a positive half cycle of applied voltage and the photocell 108 is conductive during a negative half cycle. The conductance of each photocell is so high that, in effect, during conductive conditions they ground the right hand end of resistor 143. As will appear in greater detail hereafter, the signals appearing at the right hand end of resistor 143 may be of any one of four types. If there is no light on either photocell the signal is full wave 60 cycle. If there is light on photocell 108 and not on photocell 110 the signal is positive half wave.

If there is light on photocell 110 but not on photocell 108 the signal is negative half wave. With light on both photocells there is only a small 60 cycle ripple resulting from incomplete grounding.

The right hand end of resistor 143 is connected through resistor 144 to the grid of a triode 146 which is biased to cut off (by reason of connection of its cathode to the junction of resistors 147 and 149 connected between ground and the positive supply terminal), so as to pass only positive signals appearing at its grid, i.e., resulting from the full wave and upper half wave type signals described. The amplified signals are fed to a second triode 148 which has an anode load resistor 150 and a pair of cathode load resistors 152 and 154, the outputs from the anode and from the junction of the cathode resistors being fed through the rectifying diodes 156 and 158 for supply through filter 160 of a negative direct potential to the grid of triode 162 which is connected through resistor 164 to the terminal 166. The two types of signals just mentioned produce cut-off of the triode 162.

The right hand end of resistor 143 is also connected through resistor 168 to the grid of a triode 170, the cathode resistor of which has a low value so that this triode is normally conducting. The grid of triode 170 is connected to ground through a diode 172, polarized as indicated with its anode connected to the grid, and the result is a substantial response of the triode 170 only when the input signals are of the full wave and lower half wave types previously mentioned. The signals due to the ripple signals are negligible. The output from triode 170 is delivered to a triode 174 provided with the anode load resistor 176 and the cathode resistors 178 and 180. The anode of triode 174 and the junction of the resistors 178 and 180 supply outputs to the rectifying diodes 182 and 184 which through filter 186 provides direct signals to the grid of triode 188, the anode of which is connected through resistor 190 to terminal 192. The triode 188 is cut off by the negative potential appearing at its grid when the inputs are of the full wave and lower half wave types.

Reference may now be made to the coded film 71, a typical portion of which is illustrated in FIGURE 8. While the transparent and opaque regions of this film may obviously be reversed, consistent with what is herein described the film contains along its length in an opaque background two series of transparent areas 193 and 197 which will hereafter be referred to as "openings" since they could equally well be provided by perforations in an opaque tape or film. The respective series of openings are associated with the photocells 110 and 108 across which they pass as indicated in FIGURE 8. The successive openings along the length of the tape are considerably exaggerated in FIGURE 8 relative to the sprocket openings, this exaggeration being for the sake of clarity. At intervals, openings of the series 193 and 197 occur in pairs as indicated at 199. For the sake of uniformity of description it may be assumed that these paired openings 199 occur at intervals along the film corresponding to displacements of the float of 0.1 foot. As shown in FIGURE 8, the openings of either one or the other of the series 193 and 197 occur at regular intervals, there being one of these at each opening interval. The openings 193 may be referred to as digit openings, and the openings 197 as zero openings, as will appear apt from consideration of the binary coding system which they represent. The length of each opening in the direction of the length of the tape is the same as the spacing between successive openings. Considering both the openings and the spaces between them, the intervals between corresponding ends of pairs 199 of the openings are subdivided into twenty-four equal spaces, and consistent with what has been said, this means that the length of each opening and the length of the space between each pair of openings corresponds closely to 0.004 foot of float displacement. Between the successive sets of double openings 199, the digit and zero openings are coded to give a number corresponding to feet and tenths of feet of float height. It will be noted that along the right-hand edge of FIGURE 8 there are numbers which may be considered assigned to the corresponding opening positions. The coding which has been found most convenient for providing input to either a light panel indicator or a printing recorder is one which involves the determination of each digit of a decimal system by means of combinations of binary digits, herein referred to as a binary-decimal system. An opening in the series 193 represents the existence of a binary digit. An opening in the series 197 represents a zero for the corresponding binary digit. In this system, considering the successive opening positions above the lowermost pair of openings 199, it will be noted that the first four positions correspond to 0.1, 0.2, 0.4 and 0.8. Openings corresponding to the binary digits of this subgroup then give the decimal digit in the tenths place. For example, the existence of an opening 193 of this subgroup only in the 0.8 position, as illustrated, indicates that the decimal digit is 0.8. Above the subgroup of digits just referred to there then appear the positions numbered 1, 2, 4, and 8. In this subgroup openings of the zero group 197 only appear. This means that in the units position the decimal digit is zero. Above this subgroup of positions are the positions designated 10, 20 and 40. Here the digit openings appear in the positions at 10 and 40 indicating the decimal digit 5 in tens position. The complete coding for the interval under discussion is, therefore, 50.8. The next interval above this is similarly coded for 50.7 and so on in succession along the film.

The foregoing provides an elongated member provided with coded markings disposed, as shown, in two series extending lengthwise of the member and in successive groups between the double markings 199 distributed along the length of the member. Each of these groups is approximately of the same length along the member as adjacent preceding and following groups, variations in length possibly occurring for "strapping corrections." The number of markings in at least some of the groups are considerably in excess of the number, two, of lengthwise series of markings, this being in contrast with most coded systems of types heretofore used in which the number of series of markings is large to contain in binary form ample information. In each group the coding is such that complete information is embodied in the markings of each group and identifies the location of the group along the member. The complete information involves all of the markings of a group. The markings in each group are photoelectrically sensed, the sensing means and member having a large overall range of relative movement such that the sensing means may sense all of the markings provided along the member. As will appear, a small range of relative movement, in excess of the length of a group, is provided between a member and the sensing means so that in each such small range of movement the sensing means will sense all of the markings in at least one group to provide signals indicating the portion of the overall large range of movement in which such small range of movement occurs. Means responsive to signals from the sensing means provides decimal signals indicating the portion of the large range of movement in which said small range of movement occurs.

Figure 11:
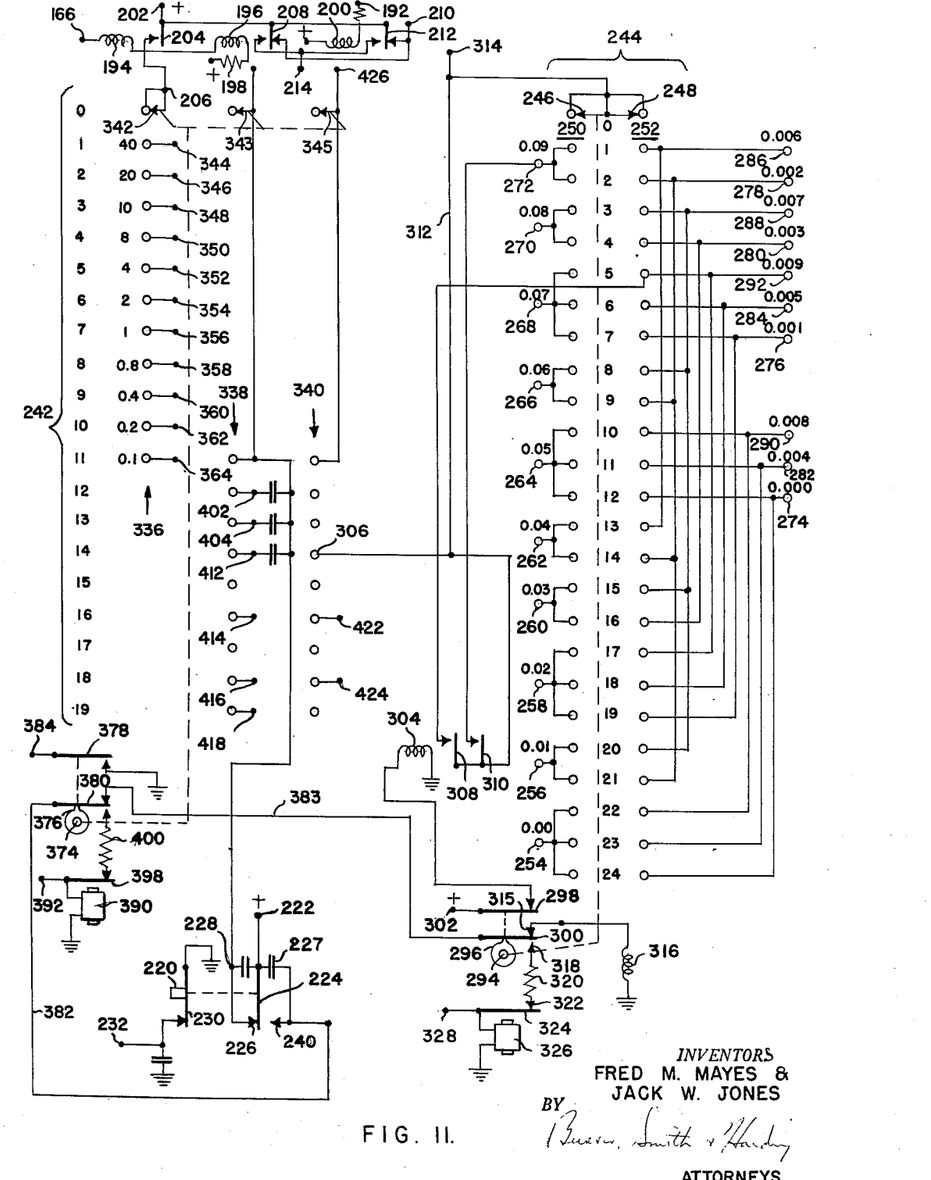
FIGURE 11 is a wiring diagram showing certain control and decoding devices and the association of the latter with inputs to indicating or recording means.

Reference may now be made to the set of relays indicated at the topmost portion of FIGURE 11. The coils of two relays 194 and 196 are connected in series with a current-limiting resistor 198 between the terminal 166 (FIGURE 10) and a positive potential source. The coil of a relay 200 is connected between the same or different positive potential source and the terminal 192 (FIGURE 10) with the interposition of a current-limiting resistor. A positive potential source 202 is connected to the movable contacts 204, 208 and 212 of the respective relays just mentioned. When the relay 194 is energized by illumination of cell 110 its movable contact 204 supplies positive potential to a terminal 206. When either the relay 196 or the relay 200 is deenergized, the positive potential from terminal 202 is supplied to a terminal 210. When either the relay 196 or the relay 200 is energized, the positive potential is applied to a terminal 214.

Figure 12:
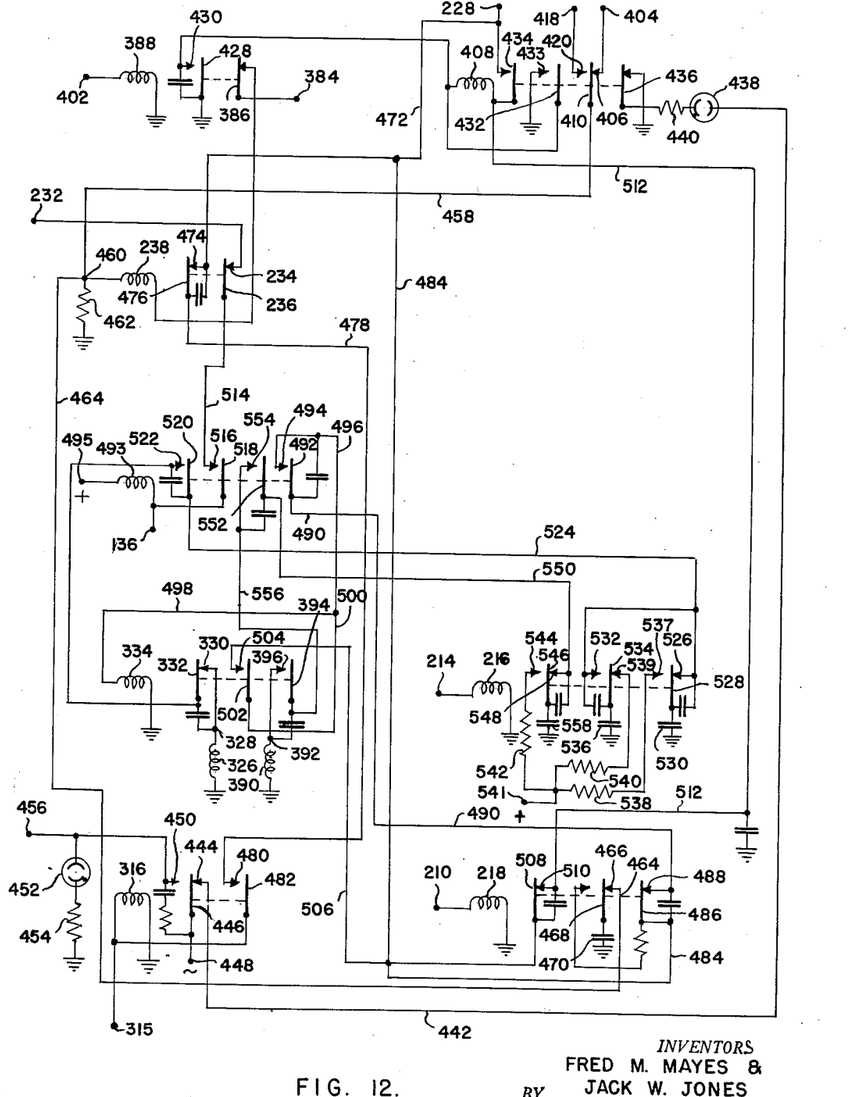
FIGURE 12 is a wiring diagram showing further control relays and their connections.

As shown in FIGURE 12 the terminal 214 is connected through the winding of a relay 216 to ground. The terminal 210 is connected through a relay 218 to ground. Since the relays 216 and 218 have fundamental functions in connection with the illumination of the photocells 108 and 110 the operation may now be described, reverting to what has been said with respect to the circuit of FIGURE 10 and considering the relays 194, 196 and 200 and their connections to the relays 216 and 218. Illumination of the photocell 110 through a digit opening 193 of the film results in current flow through the coil of relay 194 and, accordingly, the appearance of a positive potential at the terminal 206. This is also true when the photocell 110 is illuminated by the passage of a pair of openings 199. Accordingly the terminal 206 receives a positive signal upon the passage by the photocell 110 of every opening of the group 193. At all times the terminal 206 is deenergized. Thus the terminal 206 may be said to receive digit signals from the film openings.

The coil of relay 196 is energized whenever the coil of relay 194 is energized. The coil of relay 200, however, is energized only when the photocell 108 is illuminated, i.e. whenever there passes it an opening of the series 197, including the openings of this series occurring in a pair of openings 199. When both photocells are not illuminated, both of the relays 196 and 200 are deenergized.

Since both relays 196 and 200 are energized only upon the occurrence of the double pulses from both the digit and zero series of openings, the terminal 210 and the relay 218 are deenergized only at such times, the relay 218 at all other times being energized either through one or both of the contacts 208 and 212. The terminal 214 and the relay 216 are energized when either of both of the relays 196 and 200 are energized. Accordingly the relay 216 receives a pulse for the passage of any opening, either digit or zero, past the position of the photocells, so that the relay 216, in effect, counts each opening position along the film, including the positions of the double openings 199.

Summarizing the above, the terminal 206 provides positive signals corresponding to the digits on the film; relay 216 by its energization counts the opening positions on the film; and relay 218 indicates by its deenergization the passage of a double opening by the photocells.

A push button control switch 220 is provided to produce recycling of stepping switches to an initial position and for restarting the cycle of operation. In its released condition it connects a positive supply terminal 222 through its movable contact 224 and fixed contact 226 to a terminal 228 from which positive potential is applied to various elements of the circuit. Where such supply is provided the numeral 228 is used as appears, for example, at the upper parts of FIGURES 12 and 13. When the button is in its released condition it also serves, through movable contact 230, to ground a terminal 232 which is connected to a fixed contact 234 engageable by the movable contact 236 of a relay 238 (FIGURE 12).

When the button is pushed the movable contact 224 engages contact 240.

A pair of stepping switches 242 and 244 are provided to supply outputs either to a printing mechanism or to a display panel containing indicating lamps. The printing mechanism may be of conventional type provided with terminals which when energized in various decimal digit orders will set up the printing mechanism for the printing in conventional fashion of a record of the input. As will appear hereafter, the printing mechanism is herein indicated merely by its input terminals, the mechanism being conventional and hence not described in detail.

Referring first to the stepping switch 244, this switch may be of the conventional rotary type and is provided with a pair of wiper contacts 246 and 248 respectively arranged to engage fixed contacts 250 and 252 which are illustrated in FIGURE 11 in developed position. Including the home position of the contacts 246 and 248 the switch is of a type having twenty-five (or more) contacts which are numbered in the central part of the diagram of the switch. The contacts of the set 250 are connected to the terminals 254, 256, 258, 260, 262, 264, 266, 268, 270 and 272 of either a light panel or a printing machine. These terminals are respectively designated by the digital significance which they have, the set of terminals just mentioned corresponding to hundredth digits, consistent with the other portions of the disclosure. As will be noted from the diagram the contacts 250 are connected in groups of two and three with the light panel or machine input terminals.

The right-hand set of contacts 252 are connected in various combinations with the terminals 274, 276, 278, 280, 282, 284, 286, 288, 290 and 292 of either a light panel or a printing machine, these terminals having the digital significance indicated in connection therewith, the digits in the case of these terminals corresponding to thousandths. As will appear, in the more general discussion hereafter, successive subtraction is effected in the form of complementary addition, and if there are followed the connections successively achieved by the movements of the wipers 246 and 248 to the successive contacts in numerical order it will be found that the outputs are successively 0.096, 0.092, 0.087, etc., progressing in intervals of four or five thousandths down to 0.000 corresponding to the contact at position 24. The apparatus herein specifically disclosed is designed to give a reading accuracy to the nearest 0.004 foot, and the successive steps are designed to effect this end.

The shaft which carries the wipers 246 and 248 is indicated at 294 and is provided with a homing cam 296 which acts upon a pair of movable contacts 298 and 300 to cause them to engage upper fixed contacts. The upper movable contact 298 is arranged to supply from a positive potential source 302 current through the coil of a relay 304 to connect, through movable contacts 308 and 310 of the relay the terminals 292 and 272 through line 312 to an alternating current supply terminal 314, which is also connected to both of the movable wipers 246 and 248 and to a contact 306 of the stepping switch 242. This supply terminal also appears at the right of FIGURE 13. As will appear later this terminal becomes energized at appropriate times through relay operation.

The second movable contact 300 engaged by the cam 296 provides energization for the coil of a relay 316 (FIGURE 12) through the fixed contact 315. In its released position, movable contact 300 engages the fixed contact 318 which is connected through resistor 320 to a fixed contact 322 engageable with the vibrating contact 324 which is acted upon by the driving solenoid 326 of the stepping switch, which solenoid is connected between ground and a terminal 328 which is connected, as illustrated in FIGURE 12, to a fixed contact 330 engageable by the movable contact 332 of a relay 334. The stepping switch is of conventional type in which a spring is tensioned by the solenoid 326 during a period of energization thereof and effects advance of the shaft 294 step by step each time the solenoid is deenergized. As will hereafter appear, the stepping switch 244 is originally in its home position, and is then advanced step by step in the cycle of operation to an extent determined by pulses originating in the coded film. After the operational cycle is completed, homing is effected by the vibration of the armature contact 324, the switch finally coming to rest in its home position as determined by engagement of the cam 296 to raise the contact 300 out of engagement with contact 318.

The stepping switch 242 is provided with three series of contacts 336, 338 and 340 and is also of the rotary type in which these series of contacts are engaged respectively by the wipers 342, 343 and 345. As in the case of the other relay which has been described, the positions of the contacts are numbered at the left of FIGURE 11, the home contacts being designated at zero.

Figures 13, 14:
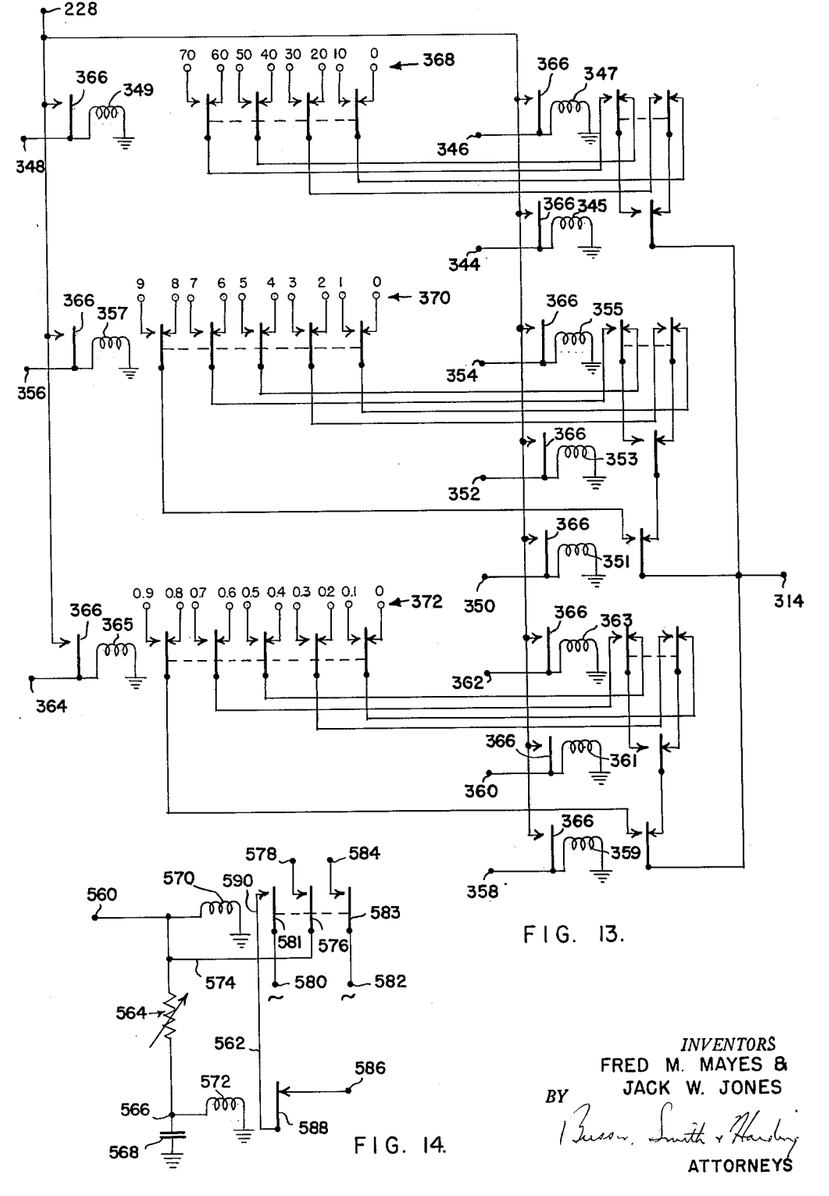
FIGURE 13 is a wiring diagram showing particularly a set of decoding relays and their connections.
FIGURE 14 is a wiring diagram showing a pair of interconnected controlling relays.

Referring now to FIGURE 13 in conjunction with the diagram of stepping switch 242, it will be noted that the first eleven contacts 336 are connected to terminals 344, 346, 348, 350, 352, 354, 356, 358, 360, 362 and 364 which in FIGURE 13 are shown as the respective terminals of the coils of relays 345, 347, 349, 351, 353, 355, 357, 359, 361, 363 and 365. These relays have relatively elaborate contact systems as shown, and, in fact, physically some of these relays may be made up of pairs of relays having their coils wound in parallel. The contacts of the series 336 correspond to the decimal digital values indicated in association therewith.

The contacts in positions 1, 2 and 3 are thus indicated as having the assigned values 40, 20 and 10. Referring to the set of relays 345, 347 and 349, it will be found that when these relays are respectively individually energized, the input from the terminal 314 will be respectively delivered to the terminals of the series 368 which are assigned the values 40, 20 and 10, and if combinations of the relays 345, 347 and 349 are energized the outputs to the terminals 368 will correspond to the sum of the assigned values for the input terminals of the relays. Thus by combinations of energization of these three relays there are secured digits in the tens place running from zero to seven, the digit being zero when all three relays are deenergized. The terminals indicated at 368 are input terminals of the tens bank of the light panel or printer. It will be noted that each of the relays shown in FIGURE 13 has a holding contact 366 which is normally open but, when the corresponding relay coil is energized serves to maintain the energization of the coil from the supply terminal 228. (It may here be noted that all of the contacts in FIGURE 13 are shown in the positions assumed when the relay coils are deenergized, the same being true of the relays shown in FIGURES 11, 12 and 14.)

The relays 351, 353, 355 and 357 form another group which supply inputs in the units positions in the light panel or printer, the terminals being indicated at 370. By following the connections shown in association with this group of relays, it will be evident that the relays 351, 353, 355 and 357 correspond to the digits 8, 4, 2, and 1. In the case of the relay 351 this may only be associated with the relay 357 to give rise to the digits 8 and 9. The other relays are arranged to be associated as described above, and will then give the digits running from zero to seven.

The third set of relays 359, 361, 363 and 365 correspond precisely to those just discussed, and the connections are the same to give the digits in the tenths positions to the light panel or printer input terminals indicated at 372.

The arrangements described may of course be extended as desired, the description here applying to a gauging system capable of measuring depths ranging up to eighty feet, and hence the uppermost relay arrangement in FIGURE 13 is only carried out to the extent of providing an output of seventy.

As will appear hereafter, what has just been described serves for the decoding of the coded openings in the 0.1 foot intervals of the film 71.

The shaft which carries the wipers 342, 343 and 345 of the stepping relay 242 is indicated at 374 and carries a homing cam 376 which acts upon the movable contacts 378 and 380 to cause them to move to upper positions. The contact 380 is connected through line 382 to the contact 240 of the push button switch already described. In its upper position it makes connection through 383 with the movable contact 300 of the stepping switch 244.

The movable contact 378 is connected to terminal 384 which is in turn connected to the movable contact 386 of the relay 388 (FIGURE 12). When released by the cam 376 it makes contact with ground.

The stepping solenoid 390 is connected to terminal 392 which is connected to the fixed contact 396 engageable by the movable contact 394 of relay 334 previously referred to. The vibrating contact 398 which engages a fixed contact connected through resistor 400 to a fixed contact engageable by movable contact 380 when the latter is released by cam 376 provides for homing of the relay 242.

Figure 15:
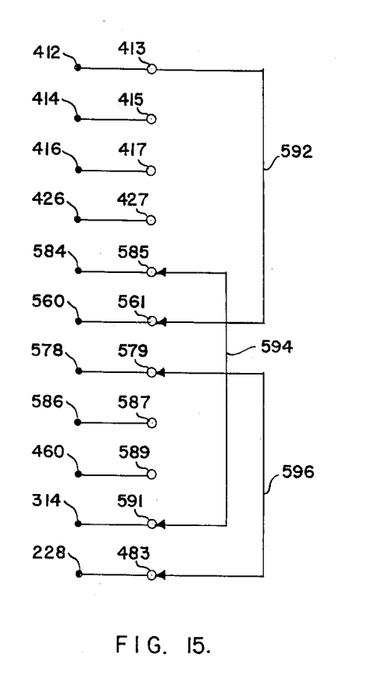
FIGURE 15 is a wiring diagram illustrating certain connections involved when indications by panel lights are involved.
Figure 16:
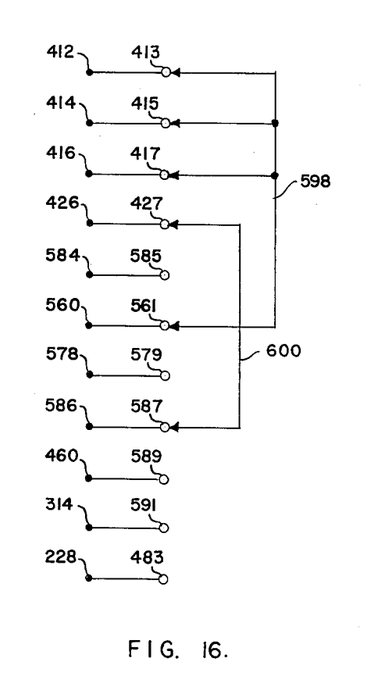
FIGURE 16 is a similar diagram illustrating connections involved when a printed output is obtained.

Referring to the contacts of the series 338 of stepping relay 242, that in position 11 is inactive, being connected, for convenience, to wiper 343. The contact in position 12 is connected to terminal 402 of relay 388. The contact in position 13 is connected to a terminal 404 which is connected to a normally closed contact of a relay 408 engaged by the movable contact 410. The contact in position 14 is connected to terminal 412 which is connected to a jumper treminal 413 (FIGURES 15 and 16). The contact in position 16 is connected to terminal 414 which is connected to jumper terminal 415. The contact in position 18 is connected to a terminal 416 which is connected to a jumper terminal 417. The contact in position 19 is connected to terminal 418, which is in turn connected to the normally open contact 420 engageable by the movable contact 410 of relay 408 (FIGURE 12).

In the series of contacts 340 of stepping relay 242, that, 306, in position 14 has already had its connections described. The contact in position 16 is connected to a terminal 422 of the printer, energization of which effects adding. The contact in position 18 is connected to a terminal 424 of the printer, energization of which effects totaling and printing. The terminal 426 connected to wiper 345 is a current supply terminal providing for the energizing of the contacts of this series.

A movable contact 428 of relay 388 engages fixed contact 430 to ground the left-hand end of the coil of relay 408 when the relay 388 is energized. The left-hand terminal of the coil of relay 408 is also grounded when it is energized by engagement of movable contact 432 with the fixed contact 433. When the coil of relay 408 is energized its movable contact 434 connects its right-hand terminal to terminal 228.

The movable contact 436 of relay 408 grounds the circuit including resistor 440 and neon bulb 438 when the relay 408 is deenergized. The connection 442 from the neon bulb connects it with the fixed contact 444 which, when reay 316 is deenergized, is engaged by movable contact 446 which is connected to the alternating supply terminal 448. When the relay 316 is energized the movable contact 446 engages the fixed contact 450 to supply current to the series arrangement of neon bulb 452 and resistor 454 and also to the terminal 456 which serves to energize the motor 80, the clutch solenoid 90 and the lamp 106, the latter through a transformer.

The movable contact 410 of relay 408 is connected through line 458 to the left-hand terminal 460 of the winding of relay 238, this terminal being also connected to ground through resistor 462. A connection 464 from the terminal 460 runs to the fixed contact 466 which is engaged by the movable contact 468 of relay 218 when that relay is deenergized. A capacitor 470 is connected between contact 468 and ground.

The terminal 228 is connected at 472 with the fixed contact 474 engageable by the movable contact 476 when the relay 238 is deenergized. The movable contact 476 is connected at 478 to the fixed contact 480 engageable by the movable contact 482 when relay 316 is energized. The movable contact 482 is connected to terminal 315.

The terminal 228 is connected to jumper terminal 483. (FIGURES 15 and 16)

The terminal 228 is also connected through 484 with the movable contact 486 which, when relay 218 is energized, engages the fixed contact 488 which is connected at 490 to the movable contact 492 which, when relay 493 is energized engages the fixed contact 494 which is connected at 496 both to the left-hand terminal of the winding of relay 334 (through connection 498) and, through connection 500, to the movable contact 502 of relay 334 which, when the relay is energized, engages the fixed contact 504 connected at 506 to the movable contact 508 of relay 218 which, when this relay is deenergized, engages the fixed contact 510 which is connected through line 512 to the right-hand terminal of the winding of relay 408.

The winding of relay 493 is connected between the terminal 136, shown in FIGURE 9, and a positive potential supply terminal 495.

A connection 514 joins the movable contact 236 of relay 238 to the fixed contact 516 which, when relay 493 is energized, is engaged by the movable contact 518 which is connected to the terminal 136.

A movable contact 520 of relay 493 engages, upon energization of this relay, the fixed contact 522 which is connected to the movable contact 332 of relay 334. The movable contact 520 is connected at 524 to the fixed contact 526 engageable by the movable contact 528 when relay 216 is deenergized. The last mentioned movable contact is connected to ground through a capacitor 530. The connection 524 also runs to the fixed contact 532 which is engaged by movable contact 534 when the relay 216 is energized, the contact 534 being connected to ground through a capacitor 536. Contacts 537 and 539 which are respectively engaged by the contacts 528 and 534 when the relay 216 is energized and deenergized are respectively connected to resistors 538 and 540 which are connected to a positive supply terminal 541 to which there is also connected a resistor 542 extending to a fixed contact 544 which is engageable by a movable contact 546 when relay 216 is energized. When the relay is deenergized, the contact 546 engages the fixed contact 548 which is connected at 550 to the movable contact 552 of relay 493 which, when this relay is energized, engages the fixed contact 554 connected at 556 to the movable contact 394 of relay 334. Movable contact 546 is connected to ground through a capacitor 558.

Referring to FIGURE 14, a terminal 560 is connected to one end of the coil of a relay 570, the other end of the coil being grounded. Through a variable resistance 564 the terminal 560 is connected also to the terminal 566 of the ungrounded end of the coil of a relay 572, a capacitor 568 being connected between 566 and ground. An alternating supply terminal 580 is connected to the movable contact 581 of the relay 570, the corresponding fixed contact 590 being connected to the movable contact 588 of relay 572, the cooperating fixed contact being connected to terminal 586. The terminal 560 is also connected to the movable contact 576 of relay 570, the corresponding fixed contact of which is connected to terminal 578. An alternating supply terminal 582 is connected to the movable contact 583 of relay 570, the corresponding fixed contact being connected to terminal 584.

Referring to FIGURES 15 and 16, terminal 426 is connected to jumper terminal 427. Terminal 584 is connected to jumper terminal 585. Terminal 560 is connected to jumper terminal 561. Terminal 578 is connected to jumper terminal 579. Terminal 586 is connected to jumper terminal 587. Terminal 460 of relay 238 is connected to jumper terminal 589. Terminal 314 (FIGURE 11) is connected to jumper terminal 591.

For operation of indicating lights, jumper connctions are made as indicated at 592, 594 and 596 in FIGURE 15. Jumper 592 connects terminals 413 and 561; jumper 594 connects terminals 585 and 591; and jumper 596 connects terminals 579 and 483.

For operation of a printing calculator the connections are as illustrated in FIGURE 16, jumper 598 connecting the terminals 413, 415, 417 and 561 and jumper 600 connecting terminals 427 and 587.

Terminal 589 is not involved in either of these jumper arrangements but is provided for apparatus testing purposes.

Operation of what has been described is initiated by the pressing of push button 220 which serves to isolate the movable contact 230 from terminal 232 and to release movable contact 224 from fixed contact 226 and to engage it with fixed contact 240.

The opening of contact 232 prevents the possibility that relay 493 may become locked during depression of the button.

At this time the stepping relays 242 and 244 will ordinarily be out of their home positions and the push button is held pressed until both of these stepping switches return to home positions in the following fashion:

When stepping switch 242 is out of its home position, the contact 380 engages the lower fixed contact which is connected through resistor 400 to the fixed contact of the vibrator 398. The positive supply from terminal 222 is connected through 224 and 240 and line 382 so that the solenoid 390 of the stepping switch is energized. This produces a break of contact at 398 so that vibration occurs resulting in the stepping as heretofore indicated of the shaft 374 until the cam 376 engages contact 380 to move it to its upper position. The stepping of the shaft 374 then stops. When this home position is reached the connection 383 is energized with a resulting similar homing action of the shaft 294 of the stepping switch 244. Finally, the cam 296 moves contact 300 to its upper position with resulting energization of the coil of relay 316. The initial energization of the coil of relay 316 causes engagement of contacts 482 and 480 which through connection 478 and the normally closed contacts 476 and 474 of relay 238 is connected through line 472 to the supply terminal 228. Thus the relay 316 is locked in its energized position wherein it supplies current from terminal 448 to the motor 80, the clutch-engaging solenoid 90 and the lamp 106, the latter being energized through a transformer. The locking action is actually completed only when the push button is released. Only then is the terminal 228 connected to the supply terminal 222, but during the transient actions occurring during release the current flow through capacitor 227 which bridges the contacts 224 and 240 maintains the relay energized.

The energizing of relay 316 results in the following besides the supplying of power to the motor, relay and lamp:

The neon lamp 452 is energized indicating that the apparatus is beginning its cycle of operation.

It may be here remarked that relay 316 remains energized ordinarily until step 19 of stepping switch 242 occurs involving engagement of wiper 343 with the contact connected to terminal 418.

With the starting of the motor and engagement of the clutch the rise of the float starts. Due to the energization of the terminal 214 as above described, the relay 216 is energized upon the passage of each opening, whether of the digit or zero series, past the photocells. In other words, the relay 216 is energized during the passage of each opening and deenergized during the passage of each space between openings. Relay 218 remains energized except during the detection of a pair of openings 199. The operations are essentially idle ones until the float emerges from the liquid to initiate a phase of operation by the firing of the thyratron 132.

Figure 7:
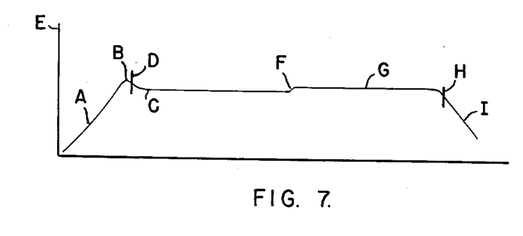
FIGURE 7 is a diagram showing the nature of the signals involved as a float moves relatively to the liquid surface.

At this time reference may be made particularly to FIGURES 7 and 9 and to the operations resulting from float movements. FIGURE 7 graphically indicates the change of potential E at the right hand end of the filter 122 in FIGURE 9 during movements of the float upward from a partially immersed position. As the float starts from its lowermost position, the potential E increases as indicated at A. Differentiation of this potential by capacitor 124 and resistor 126 involves the production of a positive potential on the grid of triode 128 appearing as a negative potential which is passed to ground through the diode 130. This potential E continues to increase until the float breaks from the surface of the liquid at the position indicated at B. As break-away occurs, a transient disturbance is set up involving a slight release of tension in the cable supporting the float which is reflected in a slight decrease of the potential E followed by a substantially constant value of this potential indicated at C which remains during the movement of the float in the space above the liquid. The transition from the rising potential A to the constant potential C, results by the operation of the differentiator in a negative pulse at the grid of triode 128, this being actually augmented by the transient just referred to, though this transient would not be necessary for the production of this negative pulse. By reason of inversion in the triode 128 this negative pulse on its grid results in a positive pulse at its anode which produces firing of the thyratron 132.

It will be convenient at this point to continue the discussion of FIGURE 7, though the firing of the thyratron as just described initiates the information-supplying part of the cycle. Later, as will appear, the motion of the float is reversed so that it moves downwardly to reenter the liquid. At the time of reversal of motion a slight transient located at F occurs in the potential E, but being positive this has no effect on the thyratron. During the period of lowering in the space above the liquid the potential remains substantially constant as indicated at G. Then as the float enters and becomes increasingly immersed in the liquid there is a decrease in potential as indicated at I again giving rise to a differentiated pulse which will fire the thyratron 132. As a result of the foregoing the thyratron is fired at the times indicated at D and H during a complete cycle of operation. As will later appear, this second firing is not material to the operation.

At both of the times D and H there is high sensitivity of occurrence of the firing with respect to float position. While specifically in accordance with the present disclosure the emergence of the float from the liquid is used as the critical event for determining the liquid level, it will be evident that with suitable revision of the cycle the immersion of the float at H may be used as the critical event for determining the liquid level.

Continuing the description of the operation of the apapratus, the discharge of the capacitor 134 results in a surge of current through the coil of relay 493 causing closure of all of its contacts. Once energized, the relay 493 remains energized through the closure of contacts 516 and 518 which are connected through the normally closed contacts 234 and 236 of relay 238 to the terminal 232 which when push button 220 is in released position is connected to ground as shown in FIGURE 11.

Stepping switch 244 is now advanced one step upon the passage by the photocells of both the beginning and end of each opening or pair of openings therein. It has been pointed out that the relay 216 is energized once for each passage of an opening. The arrangement of contacts of this relay and their associated capacitors results in an effective doubling of the number of pulses imparted to effect stepping by the energization of the solenoid 326. From FIGURE 11 it will be noted that the ungrounded terminal of solenoid 326 is connected through the normally closed contacts 330 and 332 of relay 334 to the contacts 520 and 522 which are closed upon energization of relay 493 and through connection 524 to the fixed contacts 526 and 532 of relay 216. The contact 526 is engaged by movable contact 528 when relay 216 is deenergized, whereas contact 532 is engaged by movable contact 534 when the relay 216 is energized. The movable contacts just mentioned are respectively connected to the ungrounded terminals of capacitors 530 and 536. It will be noted that the respective movable contacts 528 and 534 are located in capacitor-charging positions when the relay is respectively energized and deenergized, charging being effected through the resistors 538 and 540 from the supply terminal 541. The result is that both upon energization and upon deenergization of the relay 216 capacitor discharges occur through the stepping solenoid 326. Thus, from the standpoint of overall operation, both the beginning of an opening and the end of an opening in the film produces an advance of the stepping switch 244. These advances continue until a double opening reaches the position of the photocells, there being an advance when this occurs. The occurrence of a pair of pulses by reason of openings 199 effects deenergization of relay 218 as already mentioned. The result of this is the closing and locking of relay 334. The closing occurs through the sequence of connections 498, 496, 494, 492, 490, 488, 486, 484 and 472 leading to the terminal 228. The locking is effected upon energization of this relay through 498, 500, 504, 506, 484 and 472 leading also to terminal 228. The energization of the relay then closes the stepping circuit to the solenoid 390 of stepping switch 242 through the connections 396, 394, 556, 554, 552, 550, 548 and 546, the last being a movable contact connected to the ungrounded terminal of capacitor 558. The alternative position of contact 546 is in engagement with fixed contact 544 which is connected through resistor 542 to the positive supply terminal 541. As the relay 216 is energized by the passage of any opening by the photocells, the capacitor 558 is charged and becomes discharged through the relay coil 390 when the relay 216 is deenergized. Steps are thus imparted to the stepping switch 242, once for every opening position on the film. As the steps take place contacts are made with the contact points 336 by the brush 342 which is energized from the terminal 206 upon the passage by the photocell of the digit openings 193. The connections previously described to the relay arrangements shown in FIGURE 13 thus enter into the relay arrangement the digital values corresponding to the openings in the film, which values are retained in the arrangement of FIGURE 13 by reason of the locking of the various relays.

The results of the stepping actions may be summarized as follows:

Starting effectively from a numerical value of 0.100, each step of relay 244, corresponding to the beginnings and endings of the film openings, has subtracted 0.004 or 0.005 foot, the stepping terminating with that step corresponding to the entry of a double opening into the position of the photocells. The result is energization of the terminals of the groups 254–272 and 274–292 to give hundredths and thousandths digits to be added to tens, units and tenths digits for a complete indication.

During the eleven steps of relay 242, the binary-decimal outputs resulting from passage of the digit openings by the photocell position have set up the relays shown in FIGURE 13 to energize the tens, units and tenths terminals 368, 370, and 372 (FIGURE 14) to correspond to the coding in the film interval scanned.

Thus, at the completion of the eleventh step of relay 242 the energization either for lamp indication or for printing machine operation should be fully set up.

Provision is made for avoiding an error under a special condition which might arise. If a double opening was presented to the photocells at the time stepping would ordinarily be initiated, the relay 244 would not be stepped but stepping of relay 242 would occur. Under such circumstances the ultimate indication of level would be deficient by 0.1 foot. To insure against this possibility, relay 304 is energized when relay 244 is in its home position, through the closure of the circuit from terminal 302 by contact 298, and consequently contacts 308 and 310 are closed with the result that terminals 272 and 292 are energized for the ultimate result of adding 0.099 foot to the reading otherwise resulting from the stepping of relay 242. However, when relay 244 is out of homing position relay 304 is deenergized and contacts 308 and 310 are open.

On the twelfth step of relay 242 a test is made for the occurrence of a double opening 199. Contact 343 then is connected with terminal 402 energizing relay 388. Movable contact 428 engages fixed contact 430 grounding the left-hand end of the coil of relay 408. Opening of contact at 386 opens the ground connection of relay 238 which previously existed through 386, 384 and 378. This prevents relay 238 from being energized on step twelve. If a double pulse occurs as it should on this step, relay 218 will be deenergized causing engagement between contacts 508 and 510 energizing relay 408 through the connections 228, 472, 484, 508, 510 and 512, the left hand end of the coil of relay 408 having been grounded as just described. Relay 408 is locked to ground through 432 and 433. On the supply side the locking is effected by closure of contact at 434.

Thus the appearance of a double opening 199 causes relay 408 to lock in energized condition. The result is to cause contact 410 to leave contact 406 and engage contact 420. The ground connection of neon lamp 438 through resistor 440 and contact 436 is opened so that when relay 316 is deenergized the neon lamp will not glow.

If a double pulse does not occur on step twelve, relay 218 is not deenergized and consequently relay 408 is not energized. The result then is continued engagement between 406 and 410 and continued grounding of neon lamp 438 through resistor 440 and contact 436. Then on the thirteenth step relay 238 would be energized from wiper 343 through 404, 406, 410 and 460 and the ground connections 386, 384 and 378. The result would then be breaking of the locking circuit for relay 316 by opening of the contact at 474, 476. Deenergization of relay 316 removes power from the tank unit allowing the float to fall back into the liquid. The locking circuit of relay 493 would also be opened by the opening of contacts 234 and 236 to break its ground circuit. Neon lamp 438 would then glow indicating an error in operation.

If a double pulse properly occurs on step twelve, then nothing occurs on step thirteen, the connection between contacts 404 and 406 being open.

The use of a double pulse as a check on operation also occurs if the double pulse occurs at any other step of switch 242 between 0 and 12 except 0 and 12. If a double pulse thus incorrectly occurs, relay 218 is deenergized and capacitor 470 discharges through the coil of relay 238, energizing it and thereby deenergizing relays 493 and 316 to stop the mechanism and allow the float to drop back into the liquid.

Steps fourteen to nineteen of relay 242 are involved in the output either to indicating lamps or to a printer. Lamp operation will be first discussed with special reference to FIGURES 11, 14 and 15.

On step fourteen, brush 343 engages 412 energizing the relay 570 through 413, jumper 592, and terminals 561 and 560. Locking voltage is provided for this relay from power source 228 through terminal 483, jumper 596, terminals 579 and 578 and contact 576. Low voltage alternating current is supplied at 582 through contact 583, terminals 584 and 585, jumper 594 and terminal 591 to terminal 314 already described from which it is distributed to the decoding relay output terminals in FIGURE 13 and to the output terminals of switch 244, all of which are connected to individual lamps on a conventional display panel. It may be noted that the relays in FIGURE 13 remain locked until the push button 220 is pressed and stepping relay remains stationary until zeroed as described above, so that once the lamps are lighted they remain lighted for observation.

Using lamps for display, the steps fifteen through eighteen of relay 242 are idle. When step nineteen is reached relay 238 is energized from source 228 through brush 343, terminal 418, contacts 420 and 410, connection 458 and terminal 460. This provides deenergization of relays 493 and 316 as previously described.

When a printer is used (such as a Clary printer) the output terminals providing digital information are connected to the conventional digital input terminals of the printer. The operation using a printer is as follows:

On step fourteen brush 343 of switch 242 contacts 412 energizing relay 570 through terminal 413, jumper 598 and terminals 561 and 560. The solenoids in the keyboard of the printer are then energized from terminal 580, contacts 581 and 590, connection 562, contact 588, terminals 586 and 587, jumper 600, terminals 427 and 426, brush 345, contact 306, connection 312 and terminal 314, the current being distributed to the various output terminals as described above and thus to the solenoids. A source of suitable voltage is used, corresponding to the printer requirements. A short time after relay 570 is energized (e.g. 50 milliseconds) relay 572 is energized through resistor 564 and terminal 566. The delay is provided by the arrangement of the variable resistor 564 and capacitor 568, the latter being in parallel with the coil of relay 572. When the relay 572 is energized the alternating voltage is removed from the printer solenoids by the opening of contacts 588. The pulse of current thus provided enters the digits in the printer keyboard. Step fifteen is idle and is provided to permit capacitor 568 to discharge. On step sixteen the same operation of relays 570 and 572 is repeated, but at this time the current pulse is routed to the add solenoid of the printer through the terminal 522. This operation adds the information stored in the keyboard on step fourteen to the accumulator of the printer.

Step seventeen is idle and is provided, like step fifteen for discharge of capacitor 568.

Step eighteen is a repeat of step sixteen but in this case the pulse is routed to the total and printing solenoid of the printer through contact 424.

Step nineteen effects the same results as described for this step in the operation involving lamp indication.

A summary of the operation may be given as follows:

Initiation of operation is effected by the pressing of push button 220. The various parts of the apparatus are brought to initial condition and the motor starts and the clutch is engaged to raise the float.

When the float emerges from the liquid a signal is given out which fires the thyratron 132. This starts the information-supplying part of the cycle. Stepping switch 244 is advanced as described above, supplying a number of pulses which is proportional to the distance from the scanning position to the next double opening at the moment the float emerges.

When a double opening reaches the position of the photocells the stepping of 244 ceases and that of switch 242 begins, supplying the group of coded pulses which identifies the short support increment bounded by the next two double openings. This in turn sets up the relay arrangement in FIGURE 13. At the completion of the eleventh step of relay 242 the signal system is fully set up.

A twelfth step of relay 242 then takes place to test for the occurrence of a double opening 199.

If a double pulse does not occur on step 12 the operation is interrupted and the float is allowed to fall back into the liquid, neon lamp 438 then glowing to indicate an error in operation.

If a double pulse properly occurs on step 12 the operation proceeds and in steps 14 to 19 of relay 242 output representing the sum of the major distance identified by the coded group and the part of a short increment given by the first counted pulses is provided either to indicating lamps or to a printer.

The nineteenth step deenergizes relay 316 to remove power from the tank unit allowing the float to fall back into the liquid.

While a particular specific embodiment of the invention has been described, it will be evident that various sequences involved in the operation may be changed without departing from the fundamental aspects of the invention. For example, by a proper choice of float, the identifying operations which have been described as carried out by the stepping relay 242 might be prior to or simultaneously with the counting operations identifying the location at which a critical float-to-liquid relationship occurs. It will be also evident that, in the use of a float, the time at which the float enters, rather than leaves, the liquid may be considered critical in determination of the liquid level. Furthermore, the invention is applicable to arrangements in which a liquid level is determined by the passage of an electrode to give a critical resistance or capacitance change, or the like.

The decoding system in particular is applicable to other apparatus than that which measures liquid level. For example, it may be used in conjunction with wire lines used in bore hole or other operations which may be magnetically coded, utilizing frequency discrimination to distinguish between sets of coded pulses. Even more generally the system may be applied to readout from any elongated coded member either by causing the coded member to move relatively to a stationary scanning means or by causing a movable scanning means to move relatively to a stationary coded member.

In view of the foregoing it will be understood that the invention is not to be regarded as limited except as required by the accompanying claims.

What is claimed is:

1. Telemetering apparatus comprising an elongated member provided with coded markings, said markings being disposed in at least one series extending lengthwise of said member and in successive groups distributed along the length of said member, each of the groups being of approximately the same length along the member as adacent preceding and following groups, and the number of markings in at least some of the groups being considerably in excess of the number of lengthwise series of markings the coding of the markings in each group being such that complete information embodied in the markings of each group and identifying the location of the group along the member involves all of the markings of that group, sensing means providing electrical signals and arranged for successive sensing of the markings in each group, said sensing means and member having a large range of relative movement such that the sensing means may sense all of the markings provided along said member, means for imparting a small range of relative movement, in excess of the length of a group, between the member and the sensing means so that in each such small range of movement the sensing means will sense all of the markings in at least one group to provide signals indicating the portion of the large range of movement in which said small range of movement occurs, and means responsive to signals from said sensing means to provide decimal signals indicating the portion of the large range of movement in which said small range of movement occurs.

2. Apparatus according to claim 1 in which the coding is in a binary system.

3. Apparatus according to claim 1 in which the coding is in binary-decimal system.

4. Signal translating means comprising means for emitting a first set of signals and simultaneously a second set of signals coded in a binary system, stepping switch means arranged to be advanced step by step by signals of the first set, and relay means selectively controlled by signals of said second set emitted through said stepping switch means to provide a decimal output corresponding to said second set of coded signals.

5. Signal translating means comprising means for emitting a first set of signals and simultaneously a second set of signals coded in the binary-decimal system, stepping switch means arranged to be advanced step by step by signals of the first set, and relay means selectively controlled by signals of said second set emitted through said stepping switch means to provide a decimal output corresponding to said second set of coded signals.

6. Apparatus for gauging liquid level comprising a member arranged to traverse a liquid surface, an elongated support for said member, means independent of the level of the liquid surface for imparting to said support vertical movements of an extent which is short relatively to the full range of possible movement of said support, means providing an output signal upon the attainment of a predetermined relationship between said member and a liquid surface, means providing differentiated groups of coded markings associated with said support, each group of which completely and uniquely identifies a short lengthwise increment of said support, means responsive to said markings and providing, by relative movement between said markings and responsive means effected by said means for imparting vertical movements to said support, sequential output signals during such short movement of said support serving as a measure of position of said member, and means receiving both the first mentioned signal and the sequence of last mentioned signals to provide indication of the position of said member at the time of occurrence of said predetermined relationship, said last mentioned means including means decoding at least one complete group of said markings related to a length of said support which is short in comparison with the range of movement of said support.

7. Apparatus according to claim 6 in which said specified last mentioned means includes means responsive to the first mentioned signal to initiate counting by said counting means.

8. Apparatus according to claim 6 in which the means receiving said signals includes means responsive to the last mentioned output signals to provide identification of the particular region of said member providing such output signals.

9. Apparatus according to claim 7 in which the means receiving said signals includes means responsive to the last mentioned output signals to provide identification of the particular region of said member providing such output signals.

10. Apparatus for gauging liquid level comprising a member arranged to traverse a liquid surface, an elongated support for said member, means independent of the level of the liquid surface for imparting to said support vertical movements of an extent which is short relatively to the full range of possible movement of said support, means providing an output signal upon the attainment of a predetermined relationship between said member and a liquid surface, means providing differentiated groups of coded markings associated with said support, each group of which completely and uniquely identifies a short lengthwise increment of said support, means responsive to said markings and providing, by relative movement between said markings and responsive means effected by said means for imparting vertical movements to said support, sequential output signals during such short movement of said support serving as a measure of position of said member, and means receiving both the first mentioned signal and the sequence of last mentioned signals to provide indication of the position of said member at the time of occurrence of said predetermined relationship, said last mentioned means including means counting markings less than the entire markings of one group and then translating at least one complete group of said markings related to a length of said support which is short in comparison with the range of movement of said support, into a decimal output.

11. Apparatus according to claim 10 including means responsive to the operation of said counting and translating means to indicate an error occurring in said translating operation.

12. Signal translating means comprising means for emitting a set of signals, a stepping switch means arranged to be advanced step by step by said signals, said stepping switch means having output terminals and contacts selectively engaged during its operation and connected to said terminals to provide a decimal output corresponding to said signals, means for emitting a second set of signals and, simultaneously with said second set, a third set of signals coded in a binary system, second stepping switch means arranged to be advanced step by step by signals of the second set, and relay means selectively controlled by signals of said third set emitted through said second stepping switch means to provide a decimal output corresponding to said third set of coded signals.

References Cited in the file of this patent

UNITED STATES PATENTS

| | | |
|---|---|---|
| 1,862,619 | Fox | June 14, 1932 |
| 2,132,213 | Locke | Oct. 4, 1938 |
| 2,609,439 | Marshall et al. | Sept. 2, 1952 |
| 2,627,660 | Smith | Feb. 10, 1953 |
| 2,680,241 | Gridley | June 1, 1954 |
| 2,704,401 | Mohr et al. | Mar. 22, 1955 |